United States Patent [19]
Sperling et al.

[11] Patent Number: 5,356,972
[45] Date of Patent: Oct. 18, 1994

[54] NUCLEATING AGENTS FOR POLY(ETHYLENE TEREPHTHALATE)

[75] Inventors: Leslie H. Sperling, Bethlehem, Pa.; Leonard W. Barrett, Maplewood, Minn.

[73] Assignees: Istituto Guido Donegani S.p.A., Novara; Enichem S.p.A., Milan, both of Italy

[21] Appl. No.: 921,139

[22] Filed: Jul. 29, 1992

[51] Int. Cl.$^5$ .......................... C08K 5/11; C08K 5/09; C08K 5/04
[52] U.S. Cl. .................... 524/313; 524/396; 524/400
[58] Field of Search .................. 524/313, 396, 400

[56] References Cited

U.S. PATENT DOCUMENTS

| | | | |
|---|---|---|---|
| 3,023,122 | 2/1962 | Pataky | 524/313 |
| 4,344,874 | 8/1982 | Akagi et al. | 524/396 |
| 4,351,757 | 9/1982 | Hoeschele | 524/396 |
| 4,486,561 | 12/1984 | Chung et al. | |
| 4,539,352 | 9/1985 | Chung et al. | |
| 4,540,729 | 9/1985 | Williams | |
| 4,551,485 | 11/1985 | Ragan et al. | |

FOREIGN PATENT DOCUMENTS 0073042  3/1983  European Pat. Off.

OTHER PUBLICATIONS

PMSE 66:395 (Mar. 1992) "Vernonia Oil Based Semi--IPM's with Poly(Ethylene Terephthalate)", Barrett et al.
PMSE 65:180 (Aug. 1991) "Poly(Ethylene Terephthalate) Semi-IPNS with Functionalized Trigylceride Oils", Barrett et al.
Biotechnology and Polymers, (1991) 95–109, "Interpenetrating Polymer Networks Based On Functional Triglyceride Oils and Other Not Yet Commercial Renewable Resources", Sperling et al.
PMSE 65:345 (Aug. 1991), "Crystallization Kinetics of Poly(Ethylene Terephthalate) with Functionalized Triglyceride Oil Compositions", Barrett et al.
Poly 33(1):948 (Mar. 1992) "Bond Interchange Reactions in Functionalized Triglyceride Oil/Poly(Ethylen Terephthalate) Compositions", Barrett et al.

Primary Examiner—Kriellion S. Morgan
Attorney, Agent, or Firm—Oblon, Spivak, McClelland, Maier & Neustadt

[57] ABSTRACT

Hydroxyl group-containing triglyceride oils are effective nucleating agents for poly(ethylene terephthalate) and provide improved crystallization properties. The hydroxyl group-containing triglyceride oil may be combined with a conventional organic acid metal salt nucleating agent. By covalently bonding the hydroxyl group-containing triglyceride oil with a metal carboxylate, improved crystallization properties are obtained.

23 Claims, 2 Drawing Sheets

NUCLEATING AGENTS FOR POLY(ETHYLENE TEREPHTHALATE)

BACKGROUND OF THE INVENTION

1. Field of the Invention

Present invention relates to polyester compositions, and more particularly to poly(ethylene terephthalate) (PET) thermoplastic molding compositions containing a triglyceride oil nucleating agent.

2. Discussion of the Background

Poly(ethylene terephthalate) is a widely utilized polymer due primarily to its high strength, thermal stability, good barrier properties, its low price, and good solvent resistance. PET has established itself as a primary material in bottles, textiles, recording tape and packaging film. Injection molding is, however, one area in which, until recently, PET has not been extensively utilized, due to its slow crystallization rate which results in poor dimensional stability of molded parts. The crystallization rate of PET on cooling from the melt to the glass is considerably slower than that of poly(butylene terephthalate) (PBT) due greatly to the difficulty in forming chain folds. Its maximum crystallization rate occurs at about 180° C., roughly halfway between its glass transition temperature (approximately 75° C.) and its peak melting temperature of about 250° C.. At 90° C., a typical injection mold temperature for polyesters, the rate of crystallization for PET is virtually zero. Although one method of improving the moldability of PET has been to raise the temperature of the mold, at temperatures much greater than 110° C. it is no longer possible to use water to heat the mold, so that oil must be utilized instead. Since most molders do not wish to switch to oil heating when molding PET, nucleation agents and mobility enhancers have been developed which allow mold temperatures of 100° C. or lower. Thus, much of the prior art which has been developed in the area of PET molding concerns the development of nucleating agents which are effective in inducing rapid PET crystallization at high temperatures when cooling from the melt temperature to the mold temperature.

Developments in the 1970's and early 1980's (see for example U.S. Pat. Nos. 4,429,067; 4,352,904; 4,351,757; GB 1,292,679) in PET nucleation involved the use of aliphatic and aromatic sodium carboxylates to nucleate reinforced PET. Unlike the traditional inert solid physical nucleation agents such as talc which work by an epitaxial mechanism, these chemical nucleation agents work by dissolving in and reacting with PET. Extensive nucleation technology has been developed for PET involving the use of low molecular weight alkali metal carboxylates, as well as polymeric nucleants containing pendant alkali metal carboxylates (EP 185,981; EP 55,687; U.S. Pat. Nos. 4,349,503; 4,336,343; 4,753,975; EP 46,052; U.S. Pat. Nos. 4,483,955; 4,486,564; 4,351,757; EP 112,167).

U.S. Pat. No. 4,352,904 describes the combined use of a nucleant, i.e. "a sodium or potassium salt of a hydrocarbon acid containing between about 7 and 25 carbon atoms, or with the sodium or potassium salt of an organic polymer which contains pendant carboxyl groups ..." and secondly, a mobility enhancer, a low molecular weight organic plasticizer (e.g. ketones, esters or sulfones). A filler is also added for the purpose of reinforcement of the resin. The presence of chopped glass fiber in injection moldable PET's markedly increases both the tensile strength and modulus of the PET, resulting in improved toughness.

The use of carbonyl containing plasticizers such as esters and ketones in reinforced PET in conjunction with selected sodium or potassium carboxylates enhances the rate of crystallization when the molded part has nearly cooled to the mold temperature. See U.S. Pat. Nos. 4,352,904 and 4,351,757. Additional mobility enhancers which have been developed include mixtures of oligoethers and oligoether segments employed jointly to synergistically increase mobility of the PET (U.S. Pat. No. 4,548,978). The addition of small amounts of polyolefins, for example, polyethylene, are also observed to enhance the mobility of PET in the melt, as well as improve its toughness (U.S. Pat. No. 4,303,573).

EP 21,648 describes the nucleation of PET by a variety of different basic salts of the alkali metals including carboxylic, phenolic, phosphonic, phosphinic, sulfonic, etc. This study describes the use of a range of ionizable metal salts which are able to activate the PET chain end and thus are useful in the nucleation of PET. The alkali metal salts function to nucleate PET. The mechanism by which alkali metal salts function to nucleate PET was best addressed by the spectroscopic study undertaken by Dekoninck et al (Polymer, 1989, 30:910). They were able to demonstrate by Fourier transform infrared spectroscopy (FTIR) that a basic sodium salt reacts with the ester to cleave the PET chain and to form a sodium carboxylate chain end. The sodium salt on the end of the PET chain then facilitates crystallization by precipitating from the melt, forming sites for nucleation. If the PET is annealed in the melt for extended periods of time, the salt gradually loses its nucleating ability, which occurs by the reaction of two neighboring sodium carboxylate ends to form disodium terephthalate, a very poor nucleating agent for PET.

Most group-1a carboxylates are effective as nucleants for PET along with many other group-1a metal salts. Two examples of group-1a carboxylates which were found to be totally ineffective as PET nucleants are disodium terephthalate and sodium parahydroxybenzoate. The precise reason that some salts are more effective than others is not understood, but is believed to depend at least in part on the ability of the salt to react with PET and transfer the metal to the chain end. This could involve such factors as solubility of the salt in molten PET, the heat of fusion of the salt crystal, and the relative basicity of the salt. Finally, chemical nucleation with ionic groups on chain ends is transferable to polymers other than PET. Legras et al., have shown how polycarbonate and polyetheretherketone (PEEK) can be nucleated by the presence of ionic groups on the chain end (Polymer, 1986, 27:109; Polymer, 1990, 31:1429).

Although progress has been made in finding nucleating agents for PET, a need continues to exist for improved nucleating agents for PET, in particular, agents which enhance the crystallization rate when cooling PET from a melt and also when heating PET from a glassy state.

SUMMARY OF THE INVENTION

Accordingly, one object of the present invention is to provide a nucleating agent which is effective in creating nucleation sites for crystallization of PET.

Another object of the invention is to provide a nucleating agent which enhances crystallization when PET is cooled from the melt and also enhances crystallization when PET is heated from the glassy state.

These and other objects which will become apparent from the following specification have been achieved by the present invention in which a hydroxyl group-containing triglyceride, optionally combined with a conventional nucleating agent, is added to PET prior to injection molding. In a preferred embodiment, a hydroxyl group-containing triglyceride is chemically reacted with a metal carboxylate to form the nucleating agent.

BRIEF DESCRIPTION OF THE DRAWINGS

FIG. one (1) show the extent of crystallization versus temperature during DSC scans taken at 20° C./min for various PET compositions.

FIG. 2 shows DSC heating scans for PET and compositions of PET with the nucleating agent castor oil and/or sodium benzoate.

DETAILED DESCRIPTION OF THE PREFERRED EMBODIMENT

Figure 1A:
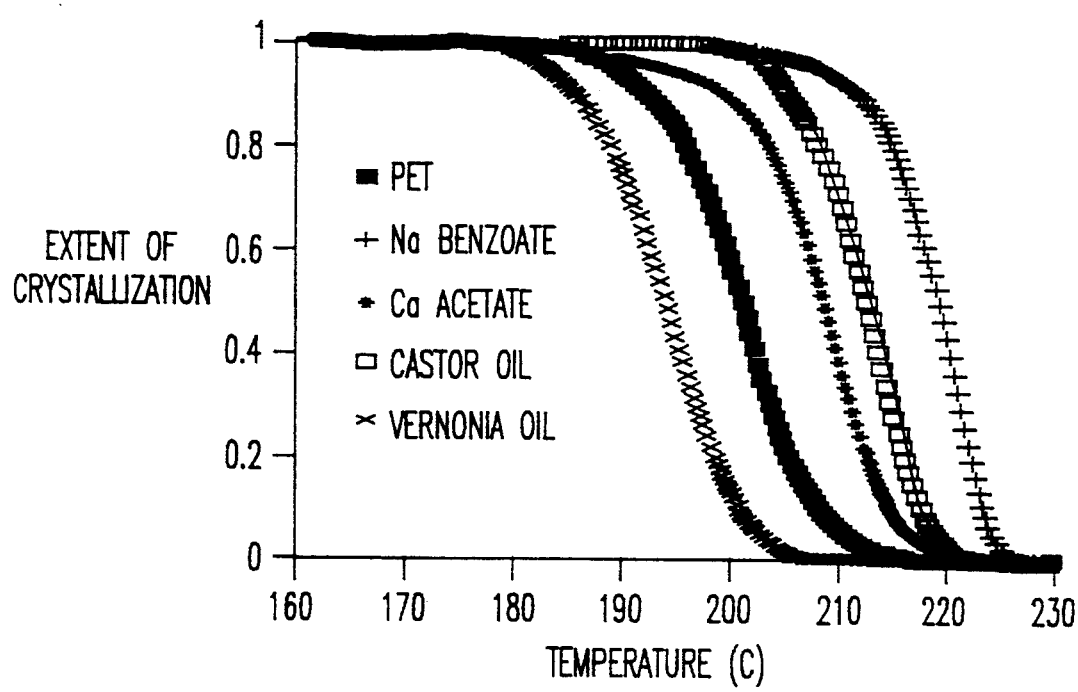
FIG. 1(A) shows crystallization results for cooling from the melt stage.

It has now been discovered that hydroxyl group-containing triglycerides and oils containing these triglycerides (referred to herein together as triglyceride oils) are effective nucleating agents for PET. Such triglyceride oils enhance the crystallization rate of PET when cooling from the melt stage and also enhance the crystallization rate when heating from the glassy state. When the triglyceride oil is combined with a conventional nucleating agent, such as a metal carboxylate, it is possible to further enhance the crystallization rate. When the conventional nucleating agent is covalently bonded to the triglyceride oil, there is a synergistic improvement in the crystallization kinetics, resulting in still further improvement in the crystallization rates.

The poly(ethylene terephthalate) used herein is preferably homopolymeric PET although crystallizable PET copolymers may also be used. Exemplary of useful PET copolymers are those copolymers in which the copolymer contains at least 80 mol percent of repeating units derived from terephthalic acid and ethylene glycol with the remainder (20 mol percent or less) being derived from other well known acid and/or glycol components. Representative acid components are phthalic acid, isophthalic acid, naphthalene 1,4- or 2,6-dicarboxylic acid, diphenyl-4,4'-dicarboxylic acid, diphenyl ether-4,4'-dicarboxylic acid, adipic acid, and sebacic acid, as well as their halogenated (preferably brominated) derivatives. The glycol components may be diethylene glycol, neopentyl glycol, cyclohexane dimethanol, 2,2-bis(4-hydroxyphenyl) propane, 1,3-propanediol, 1,4-butanediol, dibromoneopentyl glycol, the bis(2-hydroxyethyl) ether of tetrabromobisphenol A, tetrabromo-p-xylylene glycol, etc.

The poly(ethylene terephthalate)s used herein can be virgin PET or reclaimed PET. Also the PET used in the compositions of this invention should be injection moldable and thus generally can have an intrinsic viscosity (IV) as low as 0.3 and preferably between about 0.4 and 1.2, more preferably between about 0.5 and 1.0, as measured at 25° C. in a solvent consisting of 60 percent by weight phenol and 40 percent by weight of tetrachloroethane. For most injection molding applications poly(ethylene terephthalate)s in which the IV is in the range of 0.4 to 0.9 are most preferred.

The triglyceride oil nucleating agent is a hydroxyl group-containing triglyceride oil, preferably containing no epoxide groups, in which three long chain fatty acids are esterified to a glycerol molecule. The triglyceride oil may be saturated or unsaturated and preferably contains one or two pendant hydroxyl groups per long chain fatty acid. Further, each long chain fatty acid, individually, preferably contains from 12–24 carbon atoms, more preferably 16–20 carbon atoms and at least one carbon-carbon double bond. Particularly preferred triglyceride oils are lesquerella oil and castor oil, which are well known in the art. Castor oil is commercially available and generally contains about 90 percent of the triglyceride of ricinoleic acid (12-hydroxyoleic acid; $C_{18}$).

Suitable hydroxyl group-containing triglyceride oils can also be prepared synthetically by hydration reactions on triglyceride oils containing at least one carbon-carbon double bond. Triglyceride oils containing carbon-carbon double bonds are present in well known vegetable oils which are extracted in large quantities from fruit and seed crops. The principle fatty acids in these triglyceride oils include lauric, palmitic, oleic, linoleic, linolenic and ricinoleic acids which are present, for example, in coconut, palm, olive, rapeseed, soybean, cottonseed, corn, sunflower, linseed and castor oils.

Unsaturated triglyceride oils can be hydrated using conventional hydration reactions in which a molecule of water is added across carbon-carbon double bond. Suitable hydration reactions include oxymercuration and hydroboration. The hydroxyl group-containing triglyceride oils can be used as a nucleating agent for PET alone or in combination with a conventional nucleating agent.

Additionally, hydroxyl group-containing triglyceride oils can be prepared by hydroxylation reactions or by epoxidation followed by hydrolysis or ring-opening reactions to produce the hydroxyl group-containing triglyceride oils. Suitable synthetic procedures are described, for example, in "Bailey's Industrial Oil and Fat Products".

Conventional nucleating agents which may be added according to the present invention are, for example, metal salts of organic acids. Suitable salts of organic acids include alkali or alkaline earth metal salts of aliphatic (preferably $C_{2-20}$ aliphatic) and aromatic (preferably benzene) monocarboxylic acids. Examples include sodium acetate, potassium acetate, sodium propionate, potassium propionate, sodium hexanoate, sodium octanoate, sodium decanoate, sodium laurate, potassium laurate, sodium tetradecanoate, sodium hexadecanoate, sodium stearate, sodium benzoate, potassium benzoate, etc. Particularly preferred is sodium benzoate. These nucleating agents are used in combination with the triglyceride oil nucleating agent in the amounts described below.

In the present invention, the nucleating agent is (a) the triglyceride oil alone, (b) the triglyceride oil in combination with an organic acid metal salt or (c) a nucleating agent prepared by chemically bonding the triglyceride oil and the organic acid metal salt. Combinations (simple mixtures) of the triglyceride oil and organic acid metal salt can be prepared by mixing the two nucleating agents and blending these nucleating agents into molten PET or by blending each of the nucleating agents separately with PET as desired.

In a preferred embodiment, the triglyceride oil is chemically or covalently bonded to the organic acid metal salt. The covalent bond may be formed by any reaction sufficient to form a covalent chemical bond between the triglyceride oil and the organic acid metal salt. Formation of an ester bond between the free hydroxyl group of the triglyceride oil and a free carboxylic acid group of a partially neutralized dicarboxylic acid is particularly preferred. In this embodiment, in order to obtain the free carboxylic acid metal salt moiety capable of functioning as a nucleating agent, it is expedient to react the hydroxyl group of the triglyceride oil with an organic acid metal salt having a free carboxylic acid group. The free carboxylic group is available to form the ester linkage while the second carboxyl group is available as the metal salt nucleating agent.

Suitable covalently bonded compounds can be prepared by direct esterification reactions in which the hydroxyl group-containing triglyceride oil is heated with a monometal salt of a dicarboxylic acid. For example, castor oil monosodium terephthalate (COMSTA) is prepared by direct esterification as shown schematically below:

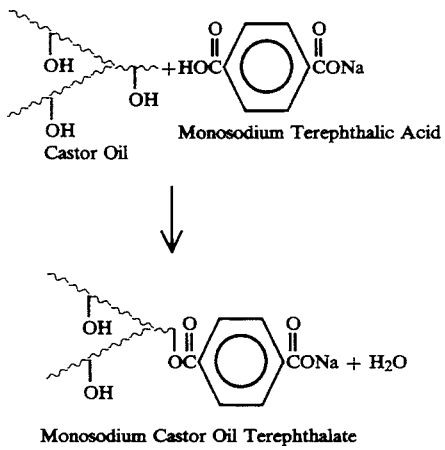

In the preparation of COMSTA, terephthalic acid is partially neutralized with sodium hydroxide in dimethyl sulfoxide (DMSO) to form monosodium terephthalic acid (MSTA). The MSTA precipitates from the DMSO and is isolated by filtering and washing with water. The isolated monosodium terephthalic acid is then reacted directly with castor oil. It is believed that the free carboxylic acid group of monosodium terephthalic acid reacts with a hydroxyl group of castor oil to form the ester linkage as shown above.

Nucleating agents which can be prepared by covalently bonding the hydroxyl group-containing triglyceride oil to a monometal dicarboxylic acid will generally have the structure shown below:

$$T-(O-C(O)-R-C(O)OM)_n.$$

In this formula, T is a triglyceride oil; M is an alkali or alkaline earth metal cation; n is 1 or more and R is phenylene or $C_{1-6}$alkylene. The hydroxyl group of the triglyceride oil is present in the —OC(O)— ester linkage between the triglyceride oil and R. Preferably, M is an alkali metal cation, such as a sodium, lithium or potassium cation. R is preferably p-phenylene or $C_{4-10}$alkylene.

As shown above, the nucleating agent prepared by esterifying the hydroxyl-containing triglyceride oil and the monometal carboxylic acid may contain one or more than one metal carboxylate group per triglyceride oil molecule. Preferably, the nucleating agent contains 1-10, more preferably 1-3 metal carboxylate groups, most preferably one metal carboxylate group.

The monometal dicarboxylic acids can be prepared by partially neutralizing the corresponding dicarboxylic acids with less than one equivalent of alkali or alkaline earth metal hydroxide in a suitable solvent such as DMSO and isolating the monometal dicarboxylic acid salt. The monometal dicarboxylic acid can be directly esterified with the hydroxyl group of the triglyceride oil by reacting the components at elevated temperature (about 180° C.) for several hours (about 10 hours) with stirring. The covalently bonded triglyceride oil/monometal dicarboxylic acid can be isolated by filtration. The covalently bonded compound can be used as a nucleating agent in pure form or in impure form containing unreacted monometal dicarboxylic acid salt.

The hydroxyl group-containing triglyceride oil of the present invention functions as an efficient nucleating agent for PET facilitating crystallization when PET is cooled from a melt and also when PET is heated from a glassy state. In general, the triglyceride oil nucleating agent is added to PET in an amount ranging from about 1 to about 30 wt. %, preferably about 5-20 wt. % to provide improved crystallization results. When a conventional metal carboxylate nucleating agent is used in combination with the triglyceride oil, the conventional nucleating agent is used an amount of about 0.1-10 wt. %, preferably about 1-5 wt. %. When the nucleating agent is the triglyceride oil covalently bonded to the metal carboxylate, the nucleating agent is also used in amounts ranging from about 1-50 wt. %, preferably 5-20 wt. % of the PET composition.

Table I shown below provides comparative enthalpy of fusion and crystallization temperature ($T_c$) data for pure PET, PET containing the convention nucleating agent sodium benzoate and PET containing each of the nucleating agents of the present invention, i.e. a hydroxyl group-containing triglyceride oil (castor oil), the triglyceride oil in combination with the conventional nucleating agent (sodium benzoate) and the triglyceride oil covalently bonded to the conventional nucleating agent (COMSTA).

TABLE I

PET crystallization data for castor oil and/or sodium benzoate compositions. $T_c$ values are from the peak temperature of DSC exotherms.

| | Cooling from Melt | | Heating from Glass | |
|---|---|---|---|---|
| Composition | ΔH+ (J/gPET) | $T_c$ (°C.) | ΔH (J/gPET) | $T_c$ (°C.) |
| PET | 45.9 | 202.2 | 36.5 | 133.6 |
| 10% Castor Oil | 58.1 | 215.0 | 40.6 | 109.7 |
| 1% Sodium Benzoate | 52.4 | 222.5 | 33.3 | 117.2 |
| 10% Castor + 1% Sodium Benz. | 49.4 | 221.8 | * | * |
| 10% COMSTA | 55.9 | 219.5 | 38.7 | 102.1 |
| 10% Vernonia oil | 49.6 | 194.7 | 38.5 | 121.1 |

+The theoretical enthalpy of fusion for 100% PET is 130 J/g.
*These samples were not quenched effectively enough for comparable data.

Table I presents data for crystallizing PET when cooling from the melt and also when heating from a glassy state. Based on injection molding considerations, it is desirable that the PET composition have a high $T_c$ when cooling from the melt, that is, as the PET cools in contact with the mold, it begins crystallizing at a high temperature. Conversely, when heating PET from a glassy state, it is desirable for the PET to crystallize at a relatively low temperature. These considerations ensure that molded PET articles will have dimensional stability and good surface appearance.

Table I shows that pure PET when cooled from a melt has a $T_c$ value of 202.2° C. The addition of castor oil significantly raises the $T_c$ to 215.0° C. only slightly less than the $T_c$ value of 222.5° C. obtained using the conventional sodium benzoate nucleating agent. The combination of castor oil/sodium benzoate and COMSTA also provide $T_c$ values similar to sodium benzoate.

For comparison, PET was mixed with vernonia oil, an epoxide-containing non-hydroxyl group-containing oil. Vernonia oil is a poor nucleating agent for PET when cooling from the melt, showing a $T_c$ value of 194.7° C. The presence of vernonia oil retards crystallization of PET.

Table I also presents crystallization data for the same compositions as heated from a glassy state. In this set of experiments, castor oil performed significantly better than conventional sodium benzoate providing a PET composition having a lower $T_c$ value. Surprisingly, COMSTA provides a PET composition having a $T_c$ value which is lower than either the value obtained for castor oil alone or sodium benzoate alone. This is evidence the covalently bonded triglyceride oil/metal carboxylate nucleating agent synergistically functions to improve PET crystallization when heating from the glassy state.

As a comparison, a PET composition containing vernonia oil exhibits crystallization data when heated from the glassy state only slightly better than pure PET and inferior to conventional sodium benzoate.

Injection moldable thermoplastic PET compositions of the present invention can be prepared by admixing the nucleating agent and PET. The compositions of the present invention can be prepared by blending the components in a blender, e.g., a tumble blender or a Henschel mixer, compounding the mixture in an extruder, e.g., a twin screw extruder, and thereafter chopping the extrudate into pellets. The pelletized part is suitable for injection molding operations. The injection molded PET articles have excellent crystallinity, dimensional stability and surface appearance.

Optionally, the composition of the present invention may contain reinforcing amounts of a reinforcing filler or other additives such as flame retardants, impact modifiers, etc. Suitable additives are well known in the art and described, for example, in U.S. Pat. No. 4,539,432 incorporated herein by reference in its entirety for a more complete description of suitable additives and amounts of these additives which may be used in the composition of the present invention.

Other features of the invention will become apparent in the course of the following descriptions of exemplary embodiments which are given for illustration of the invention and are not intended to be limiting thereof.

EXAMPLES

Blends of PET with an oil and other ingredients were made at 290° C. in a 50 cc BRABENDER PLASTICORDER torque rheometer batch mixer equipped with sigma blades. The PET was first added and allowed to melt, then the nucleating agent was added. The compositions were mixed for a maximum of 8 minutes with nitrogen purging. Samples of the material were removed from the mixer at specific times and quenched in ice water. The bulk of the PET compositions were allowed to cool slowly to room temperature resulting in highly crystalline materials. The samples removed after 5 minutes of mixing were used for analysis.

Figure 1B:
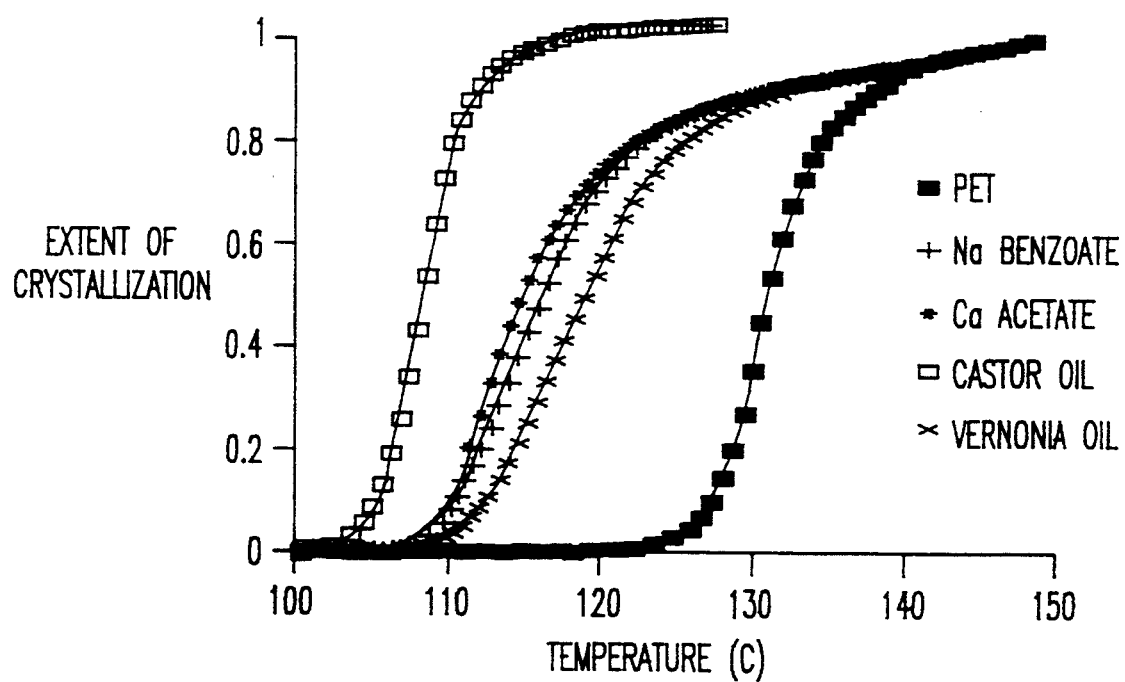
FIG. 1(B) shows crystallization results for heating from a quenched glassy state.

The extent of crystallization versus temperature was determined by differential scanning calorimetry (DSC) experiments recorded at 20° C./minute scanning temperatures. The results are shown in FIGS. 1(A) and 1(B) which compare the crystallization kinetics during both cooling from the melt and heating from the quenched glassy state. In crystallization from the melt, the conventional sodium benzoate used alone provides slightly better results then castor oil. However, castor oil is a better nucleating agent then the known calcium acetate nucleating agent used alone. Vernonia oil (an epoxidized oil) is a very poor nucleating agent, crystallizing slower then pure PET.

Figure 2A:
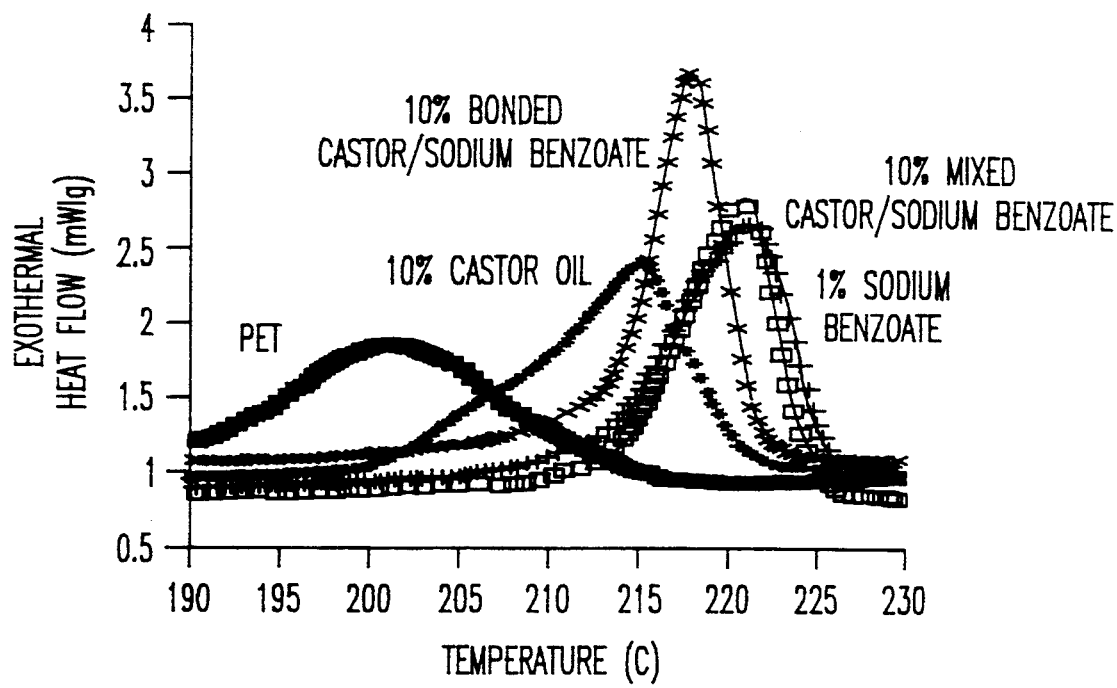
FIG. 2(A) shows DSC heating scans from the melt.
Figure 2B:
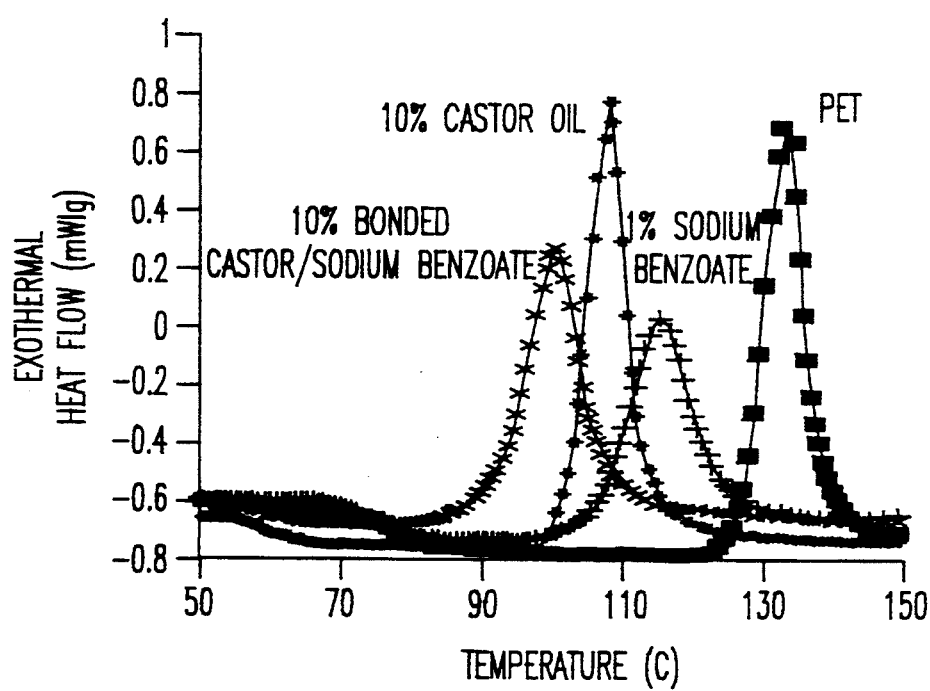
FIG. 2(B) shows DSC heating scans from the glassy state.

FIG. 2 shows DSC crystallization scans of PET compositions containing 10% COMSTA, 10% castor oil, 10% mixed castor oil/sodium benzoate or 1% sodium benzoate. In crystallization from the melt, FIG. 2 (A), the simple mixture of castor oil and sodium benzoate has a higher onset and peak crystallization temperature then the covalently bonded COMSTA composition. The COMSTA composition has a sharper crystallization peak.

Conventional nucleating agents such as sodium benzoate are effective at creating nucleation sites for crystallization, and are therefore effective at enhancing crystallization from the melt where PET mobility is adequate but nucleation sites are few. On the other hand, in crystallization from the glassy state, mobility of the PET is believed to be more important then nucleation sites. In crystallization from the glassy state, therefore, castor oil is superior to sodium benzoate or calcium acetate. In both mixed castor oil/sodium benzoate and covalently bonded castor oil/sodium benzoate (COMSTA) compositions, a synergism is seen between the mobility enhancing castor oil and the nucleation providing sodium benzoate to produce a PET material with enhanced crystallization from both the melt and glassy states.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic molding composition, comprising:
   a) a poly(ethylene terephthalate); and
   b) a nucleating agent for said poly(ethylene terephthalate) selected from the group consisting of 1) hydroxyl group-containing unsaturated triglyceride oils, 2) mixtures of a hydroxyl group-containing unsaturated triglyceride oil and a metal salt of an organic acid, and 3) a covalently bonded compound obtained by reacting a hydroxyl group-containing unsaturated triglyceride oil with a partially neutralized organic dicarboxylic acid.

2. The molding composition of claim 1, wherein said poly(ethylene terephthalate) comprises 100 mol % poly(ethylene terephthalate).

3. The molding composition of claim 1, wherein said poly(ethylene terephthalate) comprises at least 80 mol % poly(ethylene terephthalate).

4. The molding composition of claim 1, wherein said nucleating agent comprises a hydroxyl group-containing unsaturated triglyceride oil, said triglyceride oil comprising glycerol esterified with $C_{12-24}$ long chain fatty acids.

5. The molding composition of claim 4, wherein said unsaturated triglyceride oil comprises glycerol esterified with $C_{16-20}$ long chain fatty acids.

6. The molding composition of claim 1, wherein said hydroxyl group-containing unsaturated triglyceride oil is castor oil or lesquerella oil.

7. The molding composition of claim 1, wherein said metal salt of an organic acid is an alkali or alkaline earth metal salt of an aliphatic or aromatic monocarboxylic acid.

8. The molding composition of claim 7, wherein said metal salt is an alkali or alkaline earth metal benzoate.

9. The molding composition of claim 7, wherein said metal salt is an alkali or alkaline earth metal salt of a $C_{2-20}$ aliphatic monocarboxylic acid.

10. The molding composition of claim 1, wherein said nucleating agent is a covalently bonded compound obtained by reacting a hydroxyl group-containing unsaturated triglyceride oil with a partially neutralized organic dicarboxylic acid.

11. The molding composition of claim 10, wherein R is p-phenylene.

12. The molding composition of claim 10, wherein R is $C_{4-10}$alkylene.

13. The molding composition of claim 11, wherein said covalently bonded compound is monosodium castor oil terephthalate.

14. The molding composition of claim 1, wherein said hydroxyl group-containing unsaturated triglyceride oil contains no epoxide groups.

15. A nucleating agent for poly(ethylene terephthalate), comprising
   1) a hydroxyl group-containing unsaturated triglyceride oil admixed with a metal salt of an organic acid, or
   2) a covalently bonded compound obtained by reacting a hydroxyl group-containing unsaturated triglyceride oil with a partially neutralized organic dicarboxylic acid.

16. The nucleating agent of claim 15, wherein said nucleating agent is a covalently bonded compound obtained by reacting a hydroxyl group-containing unsaturated triglyceride oil with a partially neutralized organic dicarboxylic acid.

17. The nucleating agent of claim 16, wherein said hydroxyl group-containing unsaturated triglyceride oil contains no epoxide groups.

18. The nucleating agent of claim 16, wherein said covalently bonded compound is monosodium castor oil terephthalate.

19. A method of improving the crystallization properties of poly(ethylene terephthalate), comprising mixing a poly(ethylene terephthalate) with a nucleating agent for said poly(ethylene terephthalate) selected from the group consisting of 1) hydroxyl group-containing unsaturated triglyceride oils, 2) mixtures of a hydroxyl group-containing unsaturated triglyceride oil and a metal salt of an organic acid, and 3) a covalently bonded compound obtained by reacting a hydroxyl group-containing unsaturated triglyceride oil with a partially neutralized organic dicarboxylic acid.

20. The method of claim 19, wherein said hydroxyl group-containing unsaturated triglyceride oil contains no epoxide groups.

21. The molding composition of claim 10, wherein said covalently bonded compound has the formula

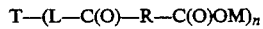
$$T-(L-C(O)-R-C(O)OM)_n$$

wherein T is a unsaturated triglyceride oil; M is an alkali or alkaline earth metal cation, n is 1 or more and R is phenylene or $C_{1-16}$alkylene.

22. The nucleating agent of claim 16, wherein said covalently bonded compound has the formula

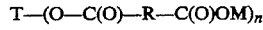
$$T-(O-C(O)-R-C(O)OM)_n$$

wherein T is a unsaturated triglyceride oil; M is an alkali or alkaline earth metal cation, n is 1 or more and R is phenylene or $C_{1-16}$alkylene.

23. The method of claim 19, wherein said nucleating agent is a covalently bonded compound obtained by reacting a hydroxyl group-containing unsaturated triglyceride oil with a partially neutralized organic dicarboxylic acid.

* * * * *